US011913090B2

United States Patent
Theaker et al.

(10) Patent No.: US 11,913,090 B2
(45) Date of Patent: Feb. 27, 2024

(54) METHOD FOR LEACHING RARE EARTH ELEMENTS AND CRITICAL MINERALS FROM ORGANICALLY ASSOCIATED MATERIALS

(71) Applicant: University of North Dakota, Grand Forks, ND (US)

(72) Inventors: Nolan Theaker, Grand Forks, ND (US); Daniel Laudal, Grand Forks, ND (US)

(73) Assignee: University of North Dakota, Fargo, ND (US)

( * ) Notice: Subject to any disclaimer, the term of this patent is extended or adjusted under 35 U.S.C. 154(b) by 41 days.

(21) Appl. No.: 17/519,341

(22) Filed: Nov. 4, 2021

(65) Prior Publication Data

US 2022/0145421 A1   May 12, 2022

Related U.S. Application Data

(60) Provisional application No. 63/112,846, filed on Nov. 12, 2020.

(51) Int. Cl.
  *C22B 59/00*  (2006.01)
  *B01D 11/02*  (2006.01)
  *C22B 3/06*   (2006.01)

(52) U.S. Cl.
  CPC ............ *C22B 59/00* (2013.01); *B01D 11/028* (2013.01); *B01D 11/0288* (2013.01); *C22B 3/06* (2013.01)

(58) Field of Classification Search
  CPC ......... C22B 59/00; C22B 3/06; B01D 11/028; B01D 11/0288; Y02P 10/20
  USPC ........................................... 75/743
  See application file for complete search history.

(56) References Cited

U.S. PATENT DOCUMENTS

2015/0086449 A1\* 3/2015 Sugita ................... C22B 3/04
                                                                   423/21.1

FOREIGN PATENT DOCUMENTS

CA                2961816 A1 \*  9/2018  ............... C22B 3/08

OTHER PUBLICATIONS

Rina Kim et al., Optimization of Acid Leaching of Rare-Earth Elements from Mongolian Apatite-Based Ore, Minerals 6, 63 (Year: 2016).\*

\* cited by examiner

*Primary Examiner* — Brian D Walck
*Assistant Examiner* — Danielle M. Carda
(74) *Attorney, Agent, or Firm* — Kinney & Lange, P.A.

(57) ABSTRACT

A method for extracting rare earth elements and critical minerals including adding an acid to a mixture comprising organically bound rare earth elements. The mixture is maintained at a pH of 0.25 to 4 for a period of time, resulting in a liquor and a leached mixture. The liquor is removed from the leached mixture to form a dewatered cake. The dewatered cake is washed to form a washing liquid. The washing liquid is recycled to create a second slurry comprising organically bound rare earth elements.

19 Claims, 1 Drawing Sheet

METHOD FOR LEACHING RARE EARTH ELEMENTS AND CRITICAL MINERALS FROM ORGANICALLY ASSOCIATED MATERIALS

CROSS-REFERENCE TO RELATED APPLICATION(S)

This application claims the benefit of U.S. Provisional Application No. 63/112,846 filed Nov. 12, 2020 for "METHOD FOR LEACHING RARE EARTH ELEMENTS AND CRITICAL MINERALS FROM ORGANICALLY ASSOCIATED MATERIALS".

STATEMENT OF GOVERNMENT INTEREST

This invention was made with government support under DE-FE0027006 awarded by the U.S. Department of Energy. The government has certain rights in the invention.

BACKGROUND

The present disclosure relates generally to extraction of rare earth elements from organically associated materials. More specifically, this disclosure relates to pH driven leaching of rare earth elements (REE) and critical minerals (CM) from organically associated materials. Critical minerals include those defined within Executive Order #13817 of the Department of the interior, and particularly include the elements cobalt (Co), gallium (Ga), germanium (Ge), indium (In), lithium (Li), platinum group metals (PGMs), rubidium (Rb), and scandium (Sc), as listed in https://www.federalregister.gov/documents/2018/05/18/2018-10667/final-list-of-critical-minerals-2018-Executive Order 13817-Final List of Critical Minerals 2018. Department of Interior, 83 FR 23295, accessed Nov. 6, 2020, which is incorporated herein to the extent it does not conflict with the present disclosure.

REE/CM are found in various materials, including organically associated sources, but producing individual elements from the ore is expensive and time consuming. Possible extraction methods include electromagnetic separation, flotation process, gravity concentration, hydrometallurgy including ion exchange and solvent extraction, fractional crystallization, and ion exchange. The cost of REE/CM recovery is highly dependent upon the reagents used during the preliminary leaching process and quantities thereof. Therefore, it is highly desirable for both cost and environmental reasons to increase the efficiency of the leaching process.

SUMMARY

A method for extracting rare earth elements and critical minerals includes adding an acid to a mixture comprising organically bound rare earth elements. The mixture is maintained at a pH of 0.25 to 4 for a period of time, resulting in a liquor and a leached mixture. The liquor is removed from the leached slurry to form a dewatered cake. The dewatered cake is washed to form a washing liquid. The washing liquid is recycled to create a second mixture comprising organically bound rare earth elements and critical minerals.

DETAILED DESCRIPTION

Figure 1:
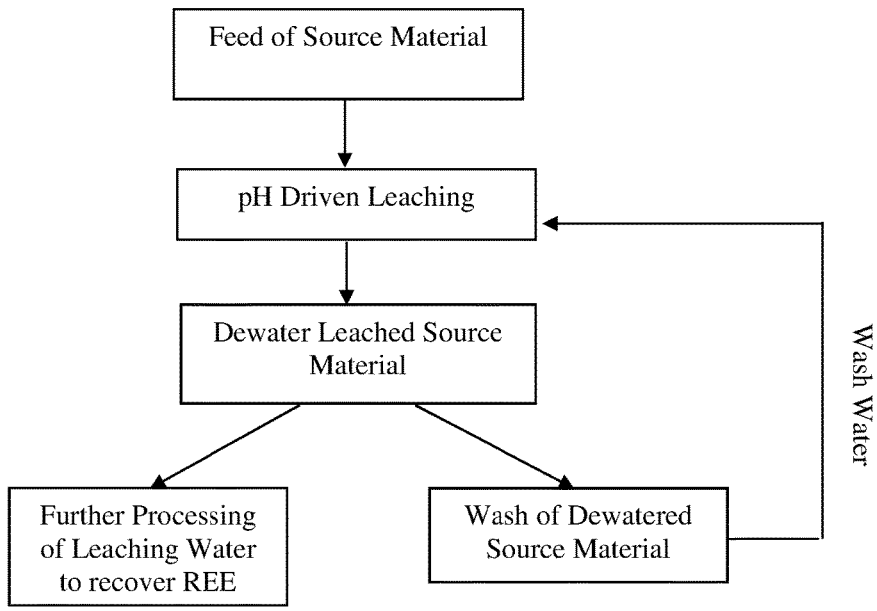
FIG. 1 is a flow chart of a representative method for pH leaching of rare earth elements.

The costs of REE/CE recovery are highly dependent upon the reagent/acid utilization during preliminary leaching processes, the concentration achieved following these processes, and additional diluents/deleterious elements extracted. There is also a drive to reduce the environmental impact of the process by decreasing the amount of reagents used and mitigating potential radioactive element concentration. As described herein, the pH of the leaching process can be controlled by dosing with concentrated reagents and recycling filter cake washing water. By this method, REE/CE recovery is increased, radioactive element recovery is decreased, and the amount of acid and water required is also decreased.

In the past, two primary forms are REE/CE have been extracted from ore bodies, mineral-based and ion-adsorbed materials. Previous work into the mineral-based extraction of the REE/CE has shown a solubility-based hindrance for REE/CE dissolution, requiring either large extractant volumes, high concentrations of mineral acids, or high-temperature roasting processes for mineral break-down. Examples of this include leaching of monazite ore (see KR101382905B1, which is incorporated in its entirety herein to the extent that it does not contradict the present disclosure), roasting and leaching of coal refuse (see Zhang, W.; Honaker, R. 2020. "Characterization and recovery of rare earth elements and other critical metals (Co, Cr, Li, Mn, Sr, and V) from the calcination products of a coal refuse sample." Fuel (267), which is incorporated in its entirety herein to the extent that it does not contradict the present disclosure), and leaching of xenotime ores (see Vijayalakshmi, R.; Mishra, S. L; Singh, H.; Gupta, C. K. 2001. "Processing of Xenotime Concentrate by Sulphuric Acid Digestion and Selective Thorium Precipitation for Separation of rare earths." Hydrometallurgy (61), which is incorporated in its entirety herein to the extent that it does not contradict the present disclosure). Ion-adsorbed materials have been shown to be related to lixiviant concentration and type, such as ammonium chloride (see CN109161683B, which is incorporated in its entirety herein to the extent that it does not contradict the present disclosure).

Recent research has identified REE/CE within low rank coals in an organically bound mechanism, and extraction methods have been investigated (see Kruger, N. W.; Moxness, L. D.; Murphy, E. C. "Rare Earth Element Concentrations in Fort Union and Hell Creek Strata in Western North Dakota." RI-117, DMR North Dakota; Laudal, D.; Benson, S. A.; Addleman, R. S.; Palo, D. 2017. "Leaching behavior of rare earth elements in fort union lignite coals of North America." Coal Geology (191); US2018265948A1, which are incorporated in their entirety herein to the extent that they do not contradict the present disclosure). Research into the mechanism by which the REE/CE are bound into this resource points towards organic complexation as the binding action, of which humic materials (found especially in low rank coals, such as lignite and leonardite) are theorized as the specific binding site (see Pédrot, M.; Dia, A.; Davranche, M. 2010. "Dynamic structure of humic acids: Rare earth elements as a fingerprint." Journal of Colloid and Interface Science (345); Eskenazy, G. 1999. "Aspects of the geochemistry of rare earth elements in coal: an experimental approach." International Journal of Coal Geology (38), which are incorporated in their entirety herein to the extent that they do not contradict the present disclosure). These materials contain ionic affinities and ion capture potential similar to cation-exchange carboxylic acid-based materials.

Cation exchange resins, particularly the carboxylic acid groups, generate distributions of extraction potential as a function of pH, enabling selective separation from one elemental group to another. These are most noticeable among different valence elements (such as the REE/CE compared with Na), with the equilibrium pH acting as the driving force in these instances, rather than solubility. Further, use of non-proton exchange mechanisms has been identified for cation exchange resins (such as Na), reducing potential acid usage.

FIG. 1 is a flow chart for a representative method for pH leaching of REE/CE. FIG. 1 shows that a feed of source material is provided, then pH driven leaching is performed forming a leached mixture and a liquor, then the leached slurry is dewatered, then the dewatered cake is washed and the rich wash water is recycled into the leaching step. The liquor is further processed to recover the REE and CM, and can be processed separately for each group (REE vs CM).

A feed of source material is provided into the process. The source material can be organically associated materials such as, for example, lignite, subbituminous coal, clay sands, peat, biomass, or crude oil. If the source material is solid, it may be crushed or ground into smaller particles or fine powders. The size of the powder particles can be, for example between 50 and 30,000 µm, between 75 and 10,000 µm, or between 100 and 1,000 µm. The fine powder or liquid is mixed with water. The concentration of source material in water is, for example, between 0.5 and 80% by weight, between 1 and 75% by weight, or between 2 and 50% by weight.

pH driven leaching is performed by adding concentrated acid to the source material mixture. The acid can be a mineral acid, for example hydrochloric acid, nitric acid, phosphoric acid, sulfuric acid, boric acid, hydrofluoric acid, hydrobromic acid, perchloric acid, hydroiodic acid, hydrochloric acid, or a combination thereof. If any of the included acids are combined, they can be combined at a ratio between 60:40 and 95:5, between 70:30 and 90:10, or between 75:25 and 85:15. The concentrated acid can have a concentration of at least 30 wt % in water, at least 70 wt % in water, or at least 90 wt % in water. Acid is added until the pH is between 0.5 and 3. The amount of acid added can be between at least 5 kg of acid per ton of ore and no more than 100 kg of acid per ton of ore, between at least 7 kg of acid per ton of ore and no more than 75 kg of acid per ton of ore, or between at least 10 kg of acid per ton of ore and no more than 45 kg of acid per ton of ore. Using less acid decreases the cost of the leaching and environmental waste. In some embodiments, the pH is between 0.5 and 2, 2 and 3.5, or 0.75 and 1. pH levels at the higher end of the range can be useful when the source material is clay sands or crude oil. Acid can be present in the leaching process in a concentration of, for example, 0.01 M to 1.5 M, 0.25 M to 1 M, or 0.5 to 0.75 M. The pH of the process is monitored and maintained. The pH can be monitored periodically or continuously. The pH can be monitored using a submerged pH meter or a flow past pH meter. The acid is allowed to leach REE and CM from the mixture for a period of time, for example 8 minutes to 5 hours, 10 min to 4 hours, 30 min to 3 hours, or 20 minutes to 90 min. Leaching can be performed between at least 10° and no more than 90° C., between at least 15° and no more than 80° C., or between at least 20° and no more than 70° C. Lower temperatures decrease the energy usage and thereby lower the cost and the environmental impact of the process.

After the source material has been leached, it is dewatered. Dewatering can be performed by any suitable method, for example pressure filtration, centrifuge, or decanting. The REE are dissolved in the aqueous liquor removed in the dewatering process. The REE/CM rich liquor is further processed in order to further refine and retrieve the REE/CM.

After the source material is dewatered to form a dewatered cake, it is washed with water. The water can be clean water or water with a small amount of REE and acid present (lean water). The source material can be washed one, two, three, or more times. In some embodiments the source material is washed first with lean water and second with clean water. In some embodiments the amount of water used is between 0.5 L and 5 L for every 1 kg of dewatered source material, between 1 L and 3 L of water for every 1 kg of dewatered source material, or between 1.5 L and 2.5 L of water for every 1 kg of dewatered source material. The washing can be performed by pressure washing. The pressure washing can be conducted between 40 psi and 150 psi, between 50 psi and 125 psi, or between 60 psi and 100 psi. When a single wash is performed the wash water is a rich wash water. When two or more washes are used the first wash of the dewatered cake creates the rich wash water, and subsequent washes create the lean wash water. The wash preparing the rich wash water may be acidified to prevent reabsorption of the REE/CM to the source material. This may be accomplished using a mineral acid, in concentrations near 1-3%, or to a resultant pH of between 0.75 and 2, or 1 and 1.5. After the dewatered source material is washed, the rich wash water is recycled, and used to create a slurry of a new dry source material or as a solvent in the leaching step as described above. Lean wash water, if any, are recycled to wash later dewatered cakes. The washed source material is further processed.

The method described above allows for a decreased use of both water and acid, which reduces both the cost and the environmental impact of the REE recovery process. Water usage can be reduced by up to half and acid usage can be reduced by up to 40% over earlier leaching processes. The method has the added benefit of having a higher recovery rate of REE and a much lower recovery rate of radioactive elements, for example uranium and thorium.

Figure 2:
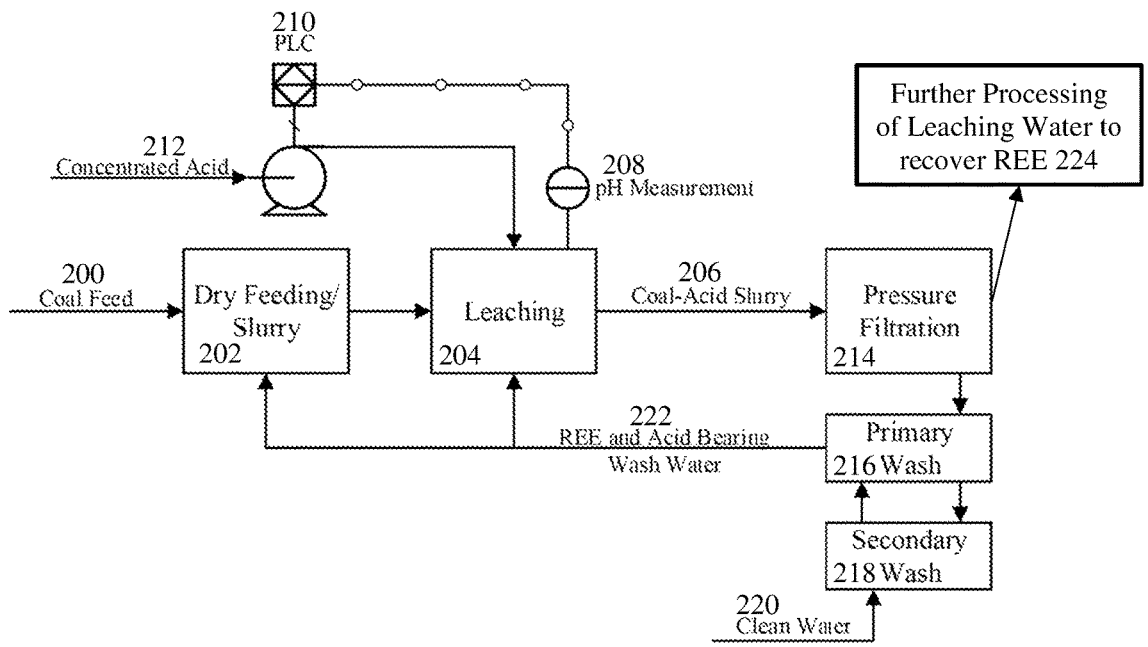
FIG. 2 is a process flow diagram of a representative method for pH leaching of rare earth elements.

FIG. 2 is a process flow diagram of a representative method for pH leaching of rare earth elements. FIG. 2 shows coal feed 200, dry feeding/slurry 202, leaching container 204, coal-acid slurry 206, pH measurement 208, a programmable logic controller (PLC) 210, concentrated acid 212, pressure filtration 214, primary wash 216, secondary wash 218, clean water 220, and REE and acid bearing wash water 222.

In a representative embodiment, a coal feed provides source material. Source material 200 is mixed with water, which can be water recycled from the washing step later in the process. Slurry 202 is then mixed with a concentrated acid in a leaching step. PH is measured continuously 208 by a submerged pH meter, and PLC 210 regulates the flow of concentrated acid 212 to maintain a pH in the leaching process 204 in a desired range. After a period of time passes, coal-acid slurry 206 is dewatered by pressure filtration 214 and removed liquor 224, now rich in REE, is further processed for recovery and refinement. The dewatered coal is washed with lean wash water under pressure first in primary wash 216 and then secondary wash cycle 218 is performed with clean water is used to remove any remaining acid and REE. The rich wash water from first washing step 216, now containing acid and REE is then used to form another coal slurry and the process is repeated. The lean wash water from second washing step 220 is used to wash another dewatered coal.

EXAMPLES

Example 1—REE pH-Based Leaching

Crushed coal was added to a mixing tank in ratios of 2:1 total water, which was comprised of coal moisture and of added rich wash water as described above, and stirred in said mixing tank for between 0.5 and 2 hours. Real-time pH measurement was conducted through use of an immersed pH probe inside of the tank. Leaching pH was targeted for 0.5, and managed through addition of concentrated (98 wt %) sulfuric acid during the mixing time. Coal/water slurry exited the tank and was fed into a filter press through use of a high-solids slurry pump to the charge pressure of the filter press (~60-100 psi). After meeting the charge pressure, flow to the filter press was stopped, after which excess liquid in the cake was removed through use of compressed air, which was delivered at 40 psi per filter press specification, to remove all trace liquid. The cake of leached coal was then washed with a similar amount of water (preferably lean wash water, otherwise clean) on a 2.1:1 dry coal basis (kg water:kg coal), generating rich wash water to utilize in the leaching tank (see above). Following this, an optional wash with clean water (if lean wash water was used previously) was conducted to generate lean wash water. The results of this method are shown in Table 1, below.

TABLE 1

| Parameter | Pre-Recycle and pH Leaching Value | Expected Change/Effect | Reasoning on Expectations | Measured Value |
| --- | --- | --- | --- | --- |
| REE Extraction | 36.3% | Increase by ~5% | Near-Expected growth | 43% |
| Acid Consumption | 40.27 mL/kg coal | Decrease by <5% | Large pH difference from rich Wash Water to leachate (~1 pH unit) | 30.99 mL/kg coal |
| U + Th Concentration (ppm Sum) | 2.88 | Increase by ~5% | Similar growth to REE - cycle up | 2.252 (20% less) |
| Water Use | | | No increase to water disbursement (still 2:1 L:S mass ratio) | |

Discussion of Possible Embodiments

The following are non-exclusive descriptions of possible embodiments of the present invention.

A method for extracting rare earth elements, critical minerals, or a combination thereof, the method comprising: adding an acid to a slurry comprising organically bound rare earth elements to maintain a pH of the slurry from 0.25 to 4 for a period of time, resulting in a liquor and a leached slurry; removing the liquor from the leached slurry to form a dewatered cake; washing the dewatered cake to form a washing liquid; and recycling the washing liquid to create a second slurry comprising organically bound rare earth elements.

The method of the preceding paragraph can optionally include, additionally and/or alternatively, any one or more of the following features, configurations and/or additional components:

A further embodiment of the foregoing method 1 wherein the slurry comprises lignite coal, subbituminous coal, or bituminous coal.

A further embodiment of any of the foregoing methods wherein the slurry comprises clay sands, peat, biomass, crude oil or a combination thereof.

A further embodiment of any of the foregoing methods wherein the acid has a concentration greater than 30 weight percent.

A further embodiment of any of the foregoing methods wherein the acid is a mineral acid.

A further embodiment of any of the foregoing methods wherein the pH is maintained between 0.5 and 2.

A further embodiment of any of the foregoing methods wherein the pH is maintained between 2 and 3.5.

A further embodiment of any of the foregoing methods wherein the period of time is between 10 minutes and 12 hours.

A further embodiment of any of the foregoing methods wherein the pH is continuously monitored.

A further embodiment of any of the foregoing methods wherein the liquor is removed from the leached slurry by filter press.

A further embodiment of any of the foregoing methods wherein the liquor is removed from the leached slurry by centrifuge.

A further embodiment of any of the foregoing methods wherein the dewatered cake is washed at between 60 and 100 psi.

A further embodiment of any of the foregoing methods wherein the dewatered cake is washed with between 1 and 5 liters of water per kilogram of dewatered cake.

A further embodiment of any of the foregoing methods wherein the liquor is further processed to recover the rare earth elements.

A further embodiment of any of the foregoing methods wherein liquor is further processed to recover critical minerals.

A further embodiment of any of the foregoing methods wherein the acid comprises two acids combined at a ratio between 60:40 and 95:5.

A further embodiment of any of the foregoing methods wherein the mixture comprising organically bound rare earth elements comprises ore and amount of acid added is be between at least 5 kg of acid per ton of ore and no more than 100 kg of acid per ton of ore.

A further embodiment of any of the foregoing methods wherein the step of adding the acid is performed between at least 10° and no more than 90° C.

A further embodiment of any of the foregoing methods further comprising adding acid in the washing step to a resultant pH of between 0.75 and 2.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for extracting rare earth elements, critical minerals, or a combination thereof, the method comprising:
    adding an acid to a mixture comprising organically bound rare earth elements, critical minerals, or a combination thereof to maintain a pH of the mixture from 0.25 to 4 for a period of time, resulting in a liquor and a leached mixture;
    removing the liquor from the leached mixture to form a dewatered cake;
    washing the dewatered cake to form a washing liquid; and
    recycling the washing liquid to create a second mixture comprising organically bound rare earth elements, critical minerals, or a combination thereof.

2. The method of claim 1 wherein the mixture comprises lignite coal, subbituminous coal, or bituminous coal.

3. The method of claim 2 wherein the pH is maintained between 0.5 and 2.

4. The method of claim 1 wherein the mixture comprises peat, biomass, crude oil or a combination thereof.

5. The method of claim 4 wherein the pH is maintained between 2 and 3.5.

6. The method of claim 1 wherein the acid has a concentration greater than 30 weight percent.

7. The method of claim 1 wherein the acid is a mineral acid.

8. The method of claim 1 wherein the period of time is between 10 minutes and 12 hours.

9. The method of claim 1 wherein the pH is continuously monitored.

10. The method of claim 1 wherein the liquor is removed from the leached mixture by filter press.

11. The method of claim 1 wherein the liquor is removed from the leached mixture by centrifuge.

12. The method of claim 1 wherein the dewatered cake is washed at between 40 and 150 psi.

13. The method of claim 1 wherein the dewatered cake is washed with between 1 and 5 liters of water per kilogram of dewatered cake.

14. The method of claim 1 wherein the liquor is further processed to recover the rare earth elements.

15. The method of claim 1 wherein liquor is further processed to recover critical minerals.

16. The method of claim 1 wherein the acid comprises two acids combined at a ratio between 60:40 and 95:5.

17. The method of claim 1, wherein the mixture comprising organically bound rare earth elements comprises ore and the amount of acid added is between at least 5 kg of acid per ton of ore and no more than 100 kg of acid per ton of ore.

18. The method of claim 1 wherein the step of adding the acid is performed between at least 10° C. and no more than 90° C.

19. The method of claim 1 further comprising adding acid in the washing step to a resultant pH of between 0.75 and 2.

* * * * *